July 26, 1938.    A. H. OELKERS    2,124,953
ROLLER BEARING
Filed Dec. 30, 1933    2 Sheets-Sheet 1

Inventor
Alfred H. Oelkers,
By Atkinson, Huxley, Byron & Knight
attys.

July 26, 1938.  A. H. OELKERS  2,124,953

ROLLER BEARING

Filed Dec. 30, 1933  2 Sheets-Sheet 2

Inventor
Alfred H. Oelkers
By Wilkinson, Huxley, Byron & Knight
attys

Patented July 26, 1938

2,124,953

UNITED STATES PATENT OFFICE 2,124,953

ROLLER BEARING

Alfred H. Oelkers, Chicago, Ill., assignor to American Steel Foundries, Chicago, Ill., a corporation of New Jersey Application December 30, 1933, Serial No. 704,617

16 Claims. (Cl. 295—36)

This invention pertains to wheel and axle assemblies.

During development and service experience with roller bearing units under heavy railroad equipment, it was learned that long bearing life and reliability of service is largely dependent on the load carrying capacity of the bearing. Great load carrying capacity in an anti-friction bearing is obtained by employing rollers of large diameter and of considerable length. It is also very important that the load imposed on the individual rollers be evenly distributed over the entire length of contact between the rollers and the raceways, and that no concentration of stress occur at any point.

In the roller bearing units herein disclosed, the inner axle on which the inner race of the bearing is mounted is supported by the race of rollers within the hub of the wheel and this axle is loaded by the journal boxes or truck side frames considerably outward of the bearing. This supporting function of the axle causes it to bend slightly in proportion to the load carried, and during operation whipping of the inner axle occurs whereby compensation at the bearing must be made. There are, therefore, these loads as well as vertical and lateral to be taken by the bearing.

When carrying heavy loads and employing a bearing of sufficient capacity, it has been found desirable to mount the cone or inner raceway of the bearing on a spherically shaped mounting sleeve, thereby permitting the axle to bend or deflect to a considerable degree without forcing the inner raceway of the roller bearing out of alignment with the rollers.

It has also developed that this mounting sleeve may be made slightly larger than the axle on which it fits, that is, with a sliding fit on the axle, provided the sleeve is made of bronze, Monel metal or manganese bronze, or other anti-friction metal which does not abrade when mounted onto the steel axle. This mounting sleeve, having a sliding fit on the axle, can be moved into position or withdrawn from the axle by hand, thereby obviating the need for pressing machines and special tools which have heretofore been necessary when mounting a bearing of this size on axles or shafts.

In the operation of roller bearing units in railway cars equipped with trucks of the pedestal type having journal boxes which are equipped with pedestal flanges transmitting the lateral forces from the truck to the axle, it has been found that when the journal box is arranged so that the lateral thrust is transmitted to the axle in only one direction, the flanges on one end of the box will wear out while those on the other end remain serviceable. For this reason a reversible box that can be removed from the truck and turned end for end has been provided, thereby permitting such reversal when the pedestal flanges on one side are worn. After the box is reversed and the pedestal flanges on the other end are brought into contact, the box can be utilized without repairs until the second flanges are similarly worn to the limit.

It is therefore an object of this invention to provide a wheel and axle assembly having a roller bearing of large capacity in which one of the race rings is mounted on a sleeve of anti-friction metal.

Another object is to provide a wheel and axle assembly wherein anti-friction bearings are provided which have a sliding fit on the inner axle of the assembly wherein the bearings are locked thereon by a shrink collar, permitting dismantling of the inner axle, bearing cone, rollers and cage without tools after the shrunk-on collar is removed.

Still another object is to provide a simple journal box for a wheel and axle assembly, which journal box is reversible.

Yet another object is to provide a lubricant containing friction bearing having cooperative engagement with one of the axles of a wheel and axle assembly and with the journal box.

A further object is to provide a journal box having sliding cooperation with the pedestal jaws on the associated side frame wherein the journal box provides lubricant between the journal box and said jaws.

A still further object is to provide inner axles for roller bearing units having a shrunk-on collar holding the roller bearing in adjustment on the inner end of the collar and receiving lateral thrust on the outer end of the collar directly from a bearing surrounding the journal end of the axle and fitting into the journal box.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1:
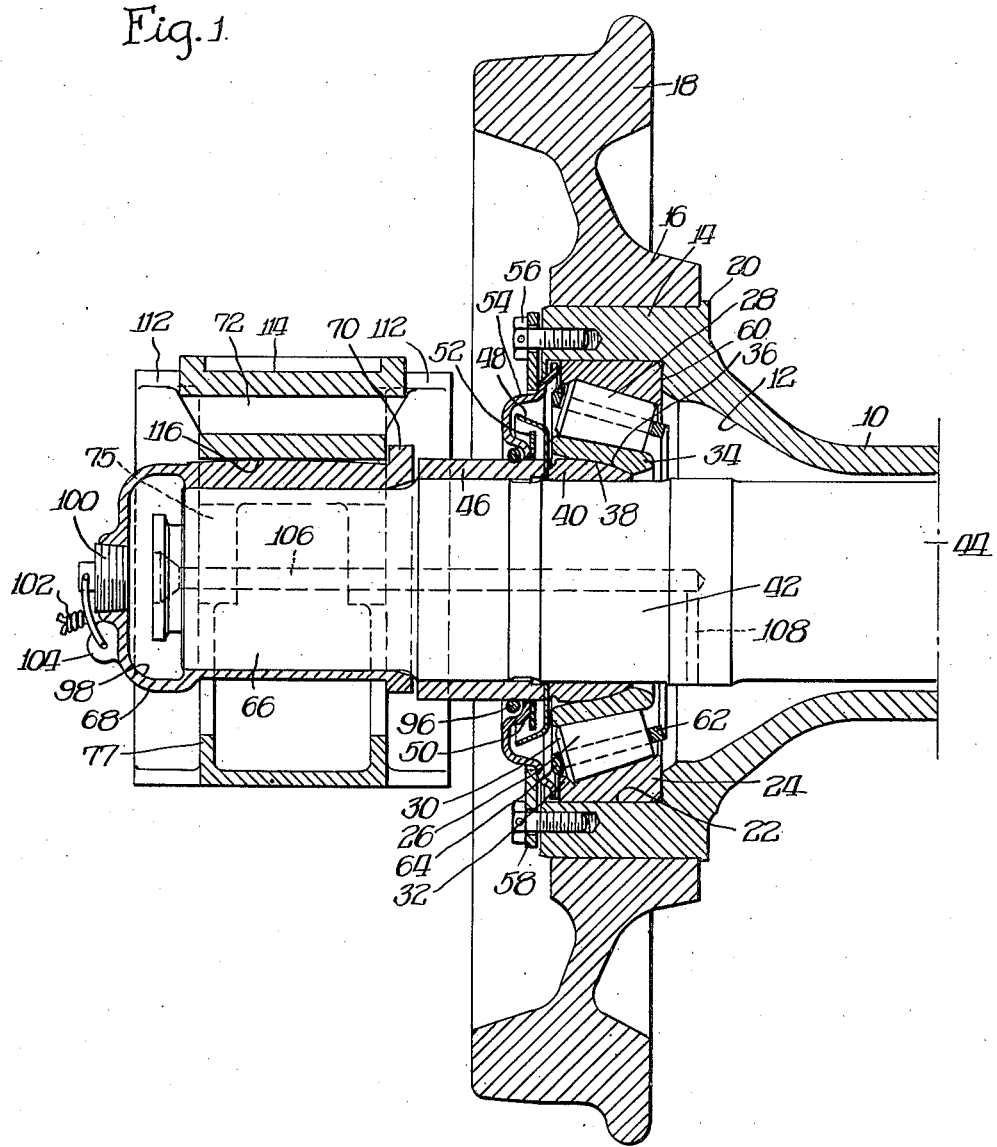
Figure 1 is a fragmentary transverse sectional elevation through one form of wheel and axle assembly embodying the invention.

This application is a continuation-in-part of application Serial No. 694,020, filed October 18, 1933; and of application Serial No. 528,548, filed April 8, 1931.

In the wheel and axle assemblies illustrated, the assemblies consist essentially of an outer axle or casing 10 flared adjacent the end thereof to provide a lubricant recess 12, the end of said axle being provided with the wheel receiving hub portion 14 for receiving the hub 16 of the wheel 18, the position of the hub being limited by the upwardly extending flange or shoulder 20. The end of said axle is provided with the bearing recess 22 for receiving the outer race 24 of the anti-friction bearing assemblies 26.

The anti-friction rollers 28 are of frusto-conical shape having a line contact with the outer racering and terminating at their outer enlarged ends with the smaller frusto-conical thrust surface 30 having cooperative engagement with the thrust shoulder 32 formed on the outer racering for accommodating end thrust from the anti-friction bearing. The bearing has a line contact with the inner racering 34, which racering is provided with the inner cylindrical surface 36 having bearing engagement with the complementary cylindrical surface 38 provided on the inner mounting sleeve 40, said mounting sleeve being preferably formed of anti-friction metal. By forming the mounting sleeve 40 of anti-friction metal, said bearing sleeve may be made of larger diameter than the bearing portion 42 of the inner axle 44 so that it may be applied thereto without the use of tools.

In the construction illustrated in Figure 1, the mounting sleeve 40 is locked in position by means of the shrink collar 46, the baffle ring 48 being secured between said mounting sleeve and shrink collar and overlying the lubricant channel 50 formed between the plate 52 and the closure plate 54, said closure plate being retained in position by means of the cap screws 56 and the ring plate 58, the inward position of the bearing assembly being defined by the shoulder 60 provided on the outer axle against which the outer racering abuts. By tightening the cap screws the cover plate may be made to force the outer racering inwardly and serve as an auxiliary securing means therefor.

Rotation of the outer axle rotates the cover plate, the outer racering and the rollers, movement of the rollers being aided by means of the cage 62 formed to retain the rollers, that is, the inner diameter of the cage is larger than the pitch diameter of the rollers, the outer end of the cage being provided with the shoulder 64 disposed adjacent the shoulder 32 whereby rotation of the outer racering causes rotation of the cage and rollers.

The outer journal end 66 of the inner substantially non-rotatable axle 44 is engaged by the cup-shaped or cylindrical bearing sleeve 68. The bearing 68 has a loose sliding fit on the journal end of the axle and is provided with the flange 70 on the inner end thereof against which the upper part of the reversible journal box 72 is forced when lateral thrust is transmitted from the car to the wheels, the flange 70 making contact with the outer end of the shrink collar 46 when such lateral thrust takes place. The bearing is also provided with a side guide portion 73 adapted to be guided against too much play with respect to the journal box by the journal box lugs 75 which are widened portions of the ribs 77. Thus thrust longitudinally of the truck is transmitted between the lugs 75 and the portion 73.

Figure 2:
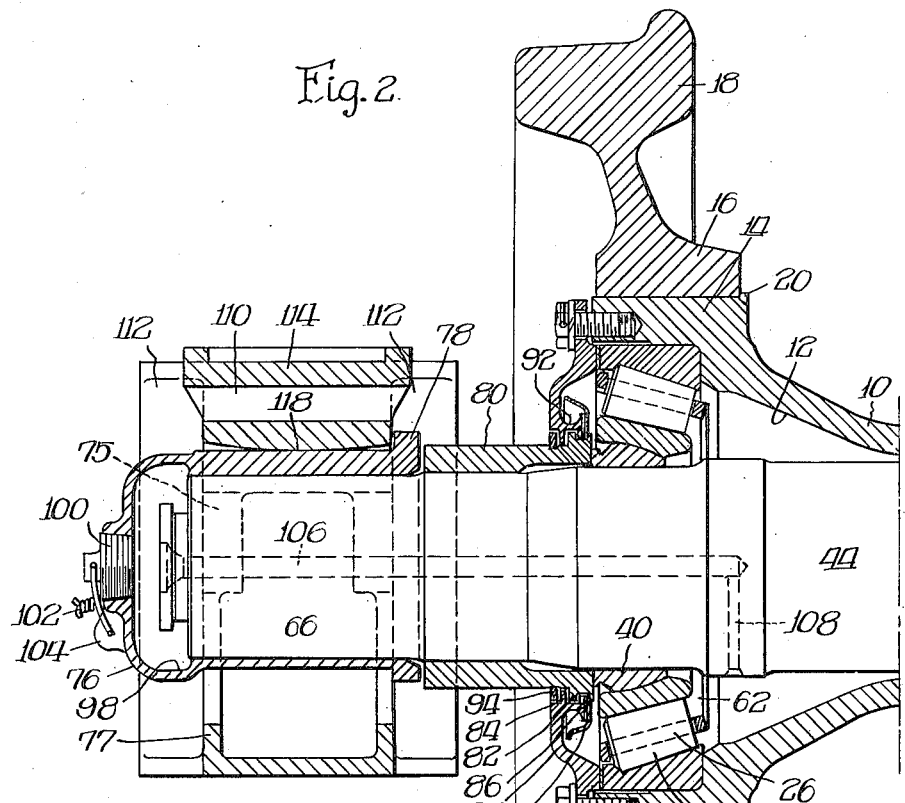
Figure 2 is a fragmentary sectional elevation of a modified form of wheel and axle assembly embodying the invention.
Figure 3:
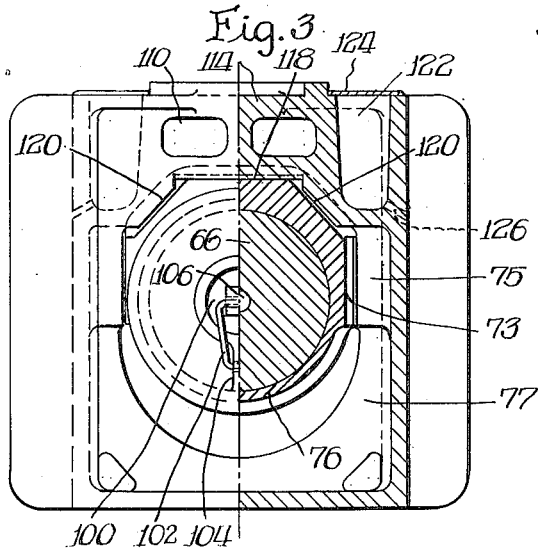
Figure 3 is an end elevation partly in section showing the reversible journal box in associated relation with the journal end of the wheel and axle assembly and its associated bearing.

A similar construction of the cylindrical bearing 76 shown in Figure 2 is followed, that is, the bearing is provided with the flange 78 corresponding to the flange 70. In this case the shrink collar 80 abuts the mounting sleeve 40, said shrink collar being provided with the upwardly extending rib 82 embraced by the spaced ribs 84 and 86 of the cover plate 88. The baffle plate 90 overlies the lubricant channel 92, said baffle plate being provided on the shrink collar. Baffle rings 94 and 96 are provided on the shrink collars 80 and 46 (Figures 2 and 1) respectively, whereby ingress of dirt and egress of lubricant is prevented.

In each modification the outer end of the journal bearing is cup shaped to provide a lubricant cavity 98, the end of the bearing being provided with the threaded plug 100 secured in position by the seal 102 secured to the retainer 104 provided on the bearing. The plug 100 is disposed opposite the lubricant port or channel 106 provided in the inner axles 44 whereby introduction of lubricant through a squirt gun is permitted to lubricate the anti-friction bearings through the oil port 108 which communicates with the lubricant recess 12. With this construction any overflow of lubricant is retained in the journal bearing for permitting gradual lubrication between the journal bearing and the journal end of the inner axle.

The journal box 72 illustrated in Figure 1 and the journal box 110 shown in Figure 2 are reversible, being symmetrical about the transverse center line, said journal boxes being provided with the pedestal engaging flanges 112 and the equalizer or spring seat 114 on which the load of the car is carried, and being symmetrical in shape about the transverse center line, the journal box may be reversed after excessive wear on one of the flanges.

In the construction illustrated in Figure 1, the journal bearing 68 is provided with the convexed upper surface 116, while in the construction illustrated in Figure 2 the journal cooperating surface 118 of the journal box is made convex in shape, permitting rocking between the inner axle and the journal box, thereby preventing the concentration of weight on either end. The journal boxes are formed so that the upper inner walls 116 in Figure 1, and 118 in Figure 2, and the adjacent walls 120 on each side of said first named walls, are of such shape and proportion that they permit interchangeably the use of the cup shaped journal bearing or the conventional journal brass used by the American Railway Association which makes contact with only the upper part of the journal bearing.

The journal boxes are also provided with the cavities 122, the tops of which are closed by some means such as a thin welded-on plate 124 the lower portions of which have drilled holes 126 making an opening on the face of the box which fits against the truck pedestals. Thus the cavities 122 may be filled with wool and lubricating oil the drainage of which through channels 126 will maintain the pedestal surfaces lubricated over an extended period of time.

In the normal operation of a roller bearing the inner axle is substantially stationary except for creepage which takes place between the bearing sleeve on the journal end of the inner axles. The lubricant chamber 98 is preferably filled with grease or heavy oil which is non-fluid at atmospheric temperatures. In case the roller bearing becomes defective or heated to such an extent that it binds the axles, then the inner axle rotates with respect to the bearing sleeve and melts and draws on the lubricant stored in the cavity 98, thereby permitting safe procedure of the vehicle to a terminal where repairs can be made. As a further emergency construction, the box may be jacked up with respect to the axle to clear the lug 78, and the bearing sleeve 76 replaced by a standard brass or journal, in which case lubricant and waste may be inserted in the box between the ribs 77 for proper lubrication of the friction assembly formed.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a wheel and axle assembly, the combination of radially spaced axles, a wheel mounted on the outer of said axles, an anti-friction bearing assembly disposed between said axles, a substantially cylindrical bearing sleeve slidably mounted on and closely fitting over the journal end of the inner of said axles and being spaced from the end thereof to provide a lubricant recess, and a journal box mounted on said bearing sleeve and being provided with a seat disposed above said inner axle, said sleeve cooperating with said bearing assembly and said journal box for transmitting end thrust therebetween.

2. In a wheel and axle assembly, the combination of radially spaced axles, a wheel mounted on the outer of said axles, an anti-friction bearing assembly disposed between said axles, said assembly including a collar shrunk on the inner of said axles, a substantially cylindrical bearing sleeve slidably mounted on and closely fitting over the journal end of the inner of said axles and being spaced from the end thereof to provide a lubricant recess, and a journal box mounted on said bearing sleeve and being provided with a seat disposed above said inner axle, said sleeve cooperating with said collar and said journal box for transmitting end thrust therebetween.

3. In combination, a truck frame member having pedestals, a normally non-rotative axle, journal means for said axle, said journal means including a substantially cylindrical friction bearing sleeve enclosing the end of and closely fitting said axle and being spaced therefrom to provide a lubricant recess to supply lubricant to said axle upon rotation thereof, and a reversible journal box associated with said bearing sleeve, said journal box being provided with a seat disposed above the axle and flanges having sliding cooperation with said pedestals.

4. In combination, a truck frame member having pedestals, a normally non-rotative axle, journal means for said axle, said journal means including a substantially cylindrical friction bearing sleeve enclosing the end of and closely fitting said axle and being spaced therefrom to provide a lubricant recess to supply lubricant to said axle upon rotation thereof, and a reversible journal box rockably associated with said bearing sleeve, said journal box being provided with a seat disposed above the axle and flanges having sliding cooperation with said pedestals.

5. In combination, a truck frame member having pedestals, a normally non-rotative axle, journal means for said axle, said journal means including a substantially cylindrical friction bearing sleeve enclosing the end of and closely fitting said axle and being spaced therefrom to provide a lubricant recess to supply lubricant to said axle upon rotation thereof, a reversible journal box rockably associated with said bearing sleeve, said journal box being provided with a seat disposed above the axle and flanges having sliding cooperation with said pedestals, and means between said bearing sleeve and journal box.

6. In combination, a truck frame member having pedestals, a normally non-rotative axle, journal means for said axle, said journal means including a substantially cylindrical friction bearing sleeve enclosing the end of and closely fitting said axle, said bearing sleeve being slidably mounted on and spaced from said axle to provide a lubricant recess to supply lubricant to said axle upon rotation thereof, and a reversible journal box rockably associated with said bearing sleeve, said journal box being provided with a seat disposed above the axle and flanges having sliding cooperation with said pedestals.

7. In combination, a truck frame member having pedestals, a normally non-rotative axle, journal means for said axle, said journal means including a substantially cylindrical friction bearing sleeve enclosing the end of and closely fitting said axle, said bearing sleeve being slidably mounted on and spaced from said axle to provide a lubricant recess to supply lubricant to said axle upon rotation thereof, a reversible journal box rockably associated with said bearing sleeve, said journal box being provided with a seat disposed above the axle and flanges having sliding cooperation with said pedestals, and means between said bearing sleeve and journal box for preventing relative angling therebetween.

8. In combination, a truck frame member having pedestals, a normally non-rotative axle, journal means for said axle, said journal means including a substantially cylindrical friction bearing sleeve enclosing the end of and closely fitting said axle and being spaced therefrom to provide a lubricant recess to supply lubricant to said axle upon rotation thereof, and a reversible journal box rockably associated with said bearing sleeve and so proportioned as to selectively accommodate the standard bearing, said journal box being provided with a seat disposed above the axle and flanges having sliding cooperation with said pedestals.

9. In a wheel and axle assembly, the combination of radially spaced axles, a wheel mounted on the outer of said axles, an anti-friction bearing assembly disposed between said axles, a substantially cylindrical bearing sleeve closed at one end and slidably mounted on and closely fitting the journal end of the inner of said axles and extending around the circumference thereof, and a journal member mounted on said bearing sleeve, said sleeve cooperating with said bearing assembly entirely around the end thereof and with said journal member for transmitting end thrust therebetween.

10. In a wheel and axle assembly, the combination of radially spaced axles, a wheel mounted on the outer of said axles, an anti-friction bearing assembly disposed between said axles, said assembly including a collar shrunk on the inner of said axles, a substantially cylindrical bearing sleeve closed at one end and slidably mounted on and closely fitting the journal end of the inner of said axles and extending around the circumference thereof, and a journal member mounted on said bearing sleeve, said sleeve cooperating with said collar entirely around the end thereof and with said journal member for transmitting end thrust therebetween.

11. In a wheel and axle assembly, the combination of radially spaced axles, a wheel mounted on the outer of said axles, an anti-friction bearing assembly disposed between said axles, said assembly including a mounting sleeve of larger diameter than said inner axle and being mounted thereon, a collar shrunk on said inner axle and normally abutting said mounting sleeve, a bearing sleeve having a substantially cylindrical opening closed at one end and closely embracing the end portion of said inner axle, and a journal member mounted on said bearing sleeve, said bearing sleeve cooperating with said journal member and being disposed in cooperative relation entirely around the end of said collar for transmitting end thrust between said inner axle and journal without displacement of said mounting sleeve.

12. In a wheel and axle assembly, the combination of radially spaced axles, a wheel mounted on the outer of said axles, an anti-friction bearing assembly disposed between said axles, said assembly including a mounting sleeve of larger diameter than said inner axle and being mounted thereon, means for maintaining said mounting sleeve in operative position, a bearing sleeve having a substantially cylindrical opening closed at one end and closely embracing the end portion of said inner axle, and a journal member mounted on said bearing sleeve, said bearing sleeve cooperating with said journal member and being disposed to cooperate entirely around the end thereof with said means for transmitting end thrust between said inner axle and journal without displacement of said mounting sleeve.

13. In a wheel and axle assembly, the combination of radially spaced axles, a wheel mounted on the outer of said axles, an anti-friction bearing assembly disposed between said axles, a lubricant recess formed between said axles, journal means for said inner axle disposed outwardly of said assembly, said means including a bearing sleeve closely embracing the end portion of said inner axle and enclosing the end thereof to provide a lubricant recess to supply lubricant to said inner axle upon rotation thereof, and a lubricant duct extending between said recesses.

14. In a wheel and axle assembly, the combination of radially spaced axles, a wheel mounted on the outer of said axles, an anti-friction bearing assembly disposed between said axles, a lubricant recess formed between said axles, journal means for said inner axle disposed outwardly of said assembly, said means including a bearing sleeve closely embracing the end portion of said inner axle and enclosing the end thereof to provide a lubricant recess to supply lubricant to said inner axle upon rotation thereof, a lubricant duct extending between said recesses, and closure means for gaining access to one of said recesses and said lubricant duct.

15. In a wheel and axle assembly, the combination of radially spaced axles, a wheel mounted on the outer of said axles, an anti-friction bearing assembly disposed between said axles, a lubricant recess formed between said axles, journal means for said inner axle disposed outwardly of said assembly, said means including a bearing sleeve closely embracing the end portion of said inner axle and enclosing the end thereof to provide a lubricant recess to supply lubricant to said inner axle upon rotation thereof, and a lubricant duct formed in said inner axle communicating with said recesses.

16. In a wheel and axle assembly, the combination of radially spaced axles, a wheel mounted on the outer of said axles, an anti-friction bearing assembly disposed between said axles, a lubricant recess formed between said axles, journal means for said inner axle disposed outwardly of said assembly, said means including a bearing sleeve closely embracing the end portion of said inner axle and enclosing the end thereof to provide a lubricant recess to supply lubricant to said inner axle upon rotation thereof, a lubricant duct formed in said inner axle communicating with said recesses, and removable closure means associated with said sleeve for gaining access to the recess therein and said duct.

ALFRED H. OELKERS.